Patented Nov. 19, 1929

1,736,741

UNITED STATES PATENT OFFICE

RENÉ BOTSON, OF AUDERGHEM-BRUSSELS, BELGIUM

METHOD OF PURIFYING CRUDE SODIUM SULPHIDE AND THE PRODUCT THEREOF

No Drawing. Application filed November 26, 1927, Serial No. 236,017, and in Italy October 24, 1927.

This invention relates to a method of purifying crude sodium sulphide and the product thereof.

This process comprises a series of operations for producing chemically pure sulphide of sodium. When used for instance as a toning salt for photographical purpose, the product is in a special condition for giving a practical result much better than any salt of the same class presently on the market. The sulphide of sodium according to the present invention is obtained in the form of crystals by treating it under steam pressure in an airtight digester until liquefied and by then purifying same by addition of caustic soda and terpinolene, decanting and filtering.

In order to ensure a better understanding of the process, the normal succession of operations will be described hereinafter:

During the first stage of the process, a given weight, say 100 kgr. of crude sulphide of sodium, obtained by the reduction of sulphate of sodium with carbon, is placed in an airtight digester. Steam is then admitted in the digester under a pressuer of 4 to 5 atmospheres, for producing the dissolution of the sulphide. The liquefaction is completed after about one hour, and the product is then drawn off the digester in the form of a blackish slime, having a strong sulphur odour. To this product, having a temperature of 80° C. is added 1% of terpinolene, obtained by distillation of the "pinus pinaster" (cluster pine), this giving about 140-160 kgr. of liquid. The terpinolene used should be very pure and free of tarry products. The object of said addition of terpinolene is to facilitate the precipitation of the impurities, chiefly in view of the operations in the second stage.

This second stage consists in adding about 500 liters of water, so as to bring the solution to a specific gravity of 13° Baumé. This liquor is then allowed to settle for 48 hours and then filtered. The delivered liquor is now clear.

In the third stage, a caustic soda solution of 35° Bé. is added to the filtered liquid, so as to give the liquor a specific gravity of 18.5° Bé. After settling and decanting, the liquor is again filtered in centrifugal filters.

In the fourth stage, the liquor is poured into evaporators and concentrated to 50 or 55%.

In the fifth and last stage, the product is poured into crystallizers located in a cooling room. The obtained crystals are then dried in a centrifugal apparatus, and are then ready for sale. Of course, the several vessels and apparatus used, should be made of a metal which is neither corroded nor dissolved by sulphide of sodium.

After separation of the crystals, the lyes left after crystallization are used instead of soda solution in the third stage of the process; this means that the 35° Bé. lyes will be used for bringing the product from 13° Bé. to 18.5° Bé. The crystals obtained are sulphide of sodium, quite pure and containing no free sulphur nor soda.

This product contains no trace of iron nor copper, is free of hypo-sulphite and can be used as a toning salt having exceptional qualities. The sepia tinges obtained with this toning salt are quite pure. The whites are not sulphurated and the photographic paper remains unaltered. The blood-red toning enables obtaining beautiful tinges, splendidly contrasting on the surrounding whites. The scale of tinges between sepia and blood-red can be controlled at the operator's choice.

I claim:

1. The method of purifying crude sodium sulphide; comprising the treatment of crude sulphide of sodium by means of pressure steam until liquefaction has taken place; adding terpinolene, decanting, filtering and adding a caustic soda liquor; concentrating the solution obtained in order to separate the chemically pure crystals of sodium sulphide, substantially as described.

2. A process for the preparation of a chemically pure toning salt for photographical use comprising the treatment of crude sulphide of sodium by means of pressure steam until liquefaction has taken place, adding a proportion of 1% of terpinolene, diluting the liquid with water to reduce its specific gravity to 13° Bé., reinforcing its specific gravity to 18, 5° Bé. by addition of a caustic soda solution at 35° Bé., decanting and filtering the liquid, concentrating it to 50% and crystallizing it under action of cold, substantially as described.

3. As a new article of manufacture, the crystallized chemically pure sulphide of sodium prepared by the treatment of crude sulphide of sodium by means of pressure steam until liquefaction has taken place, adding terpinolene, decanting, filtering and adding a caustic soda liquor; the solution obtained being concentrated in order to separate the chemically pure crystals of sodium sulphide, substantially as described.

4. The method of purifying crude sodium sulphide comprising the treatment of the crude sulphide of sodium by means of pressure steam until liquefaction has taken place, decanting, filtering and adding a caustic soda liquor; concentrating the solution obtained in order to separate the chemically pure crystals of sodium sulphide, substantially as described.

5. A process for the preparation of chemically pure sodium sulphide, comprising the treatment of crude sulphide of sodium by means of pressure steam until liquefaction has taken place, adding a proportion of 1% of terpinolene, diluting the liquid with water to reduce its specific gravity to 13° Bé., reinforcing its specific gravity to 18.5° Bé. by addition of the lyes of a previous operation, decanting and filtering the liquid, concentrating it to 50% and crystallizing it under action of cold, substantially as described.

In testimony whereof I signed hereunto my name.

RENÉ BOTSON.